United States Patent [19]

Blunt

[11] Patent Number: 4,828,977

[45] Date of Patent: May 9, 1989

[54] CONVEYOR LINE TRAINING SIMULATOR SYSTEM AND METHOD

[75] Inventor: Thomas O. Blunt, Louisville, Ky.

[73] Assignee: General Electric Company, Louisville, Ky.

[21] Appl. No.: 225,325

[22] Filed: Jul. 28, 1988

[51] Int. Cl.[4] ............................................. G09B 9/00
[52] U.S. Cl. .................................................. 434/219
[58] Field of Search ................................. 434/367, 219

[56] References Cited

U.S. PATENT DOCUMENTS

| | | | |
|---|---|---|---|
| 2,636,591 | 4/1953 | Galper | 198/19 |
| 3,128,867 | 4/1964 | Karcher, Jr. et al. | 198/19 |
| 3,568,295 | 3/1971 | Moran | 29/407 |

*Primary Examiner*—Richard C. Pinkham
*Assistant Examiner*—Valerie Szczepanik
*Attorney, Agent, or Firm*—Frederick P. Weidner; Radford M. Reams

[57] ABSTRACT

A method of demonstrating the advantage in production efficiency of non-synchronous conveyor lines over synchronous conveyor lines. There is provided an elongated diagram illustrating parallel conveyor lines with an equal number of paired, opposed operator work stations in each line, one line representing a synchronous line and the other line representing a non-synchronous line, the non-synchronous line being provided with queue patterns between each work station. There is an electrically controlled work station box between each pair of opposed synchronous and non-synchronous work stations on the mat, each box having a set of "go/no-go" visual indicators. A signal controller is coupled to each of the operating station boxes, the controller being programmed to provide control signals in a random fashion to each of the paired work stations. A plurality of workpieces are provided for each conveyor line. Operators positioned at each of the synchronous and non-synchronous work stations are given instructions for each synchronous station to respond to a "go" indication at his work station to transfer the workpiece from that work station to the next work station and for the non-synchronous operator to respond to a "go" indication at his work station to transfer the workpiece from that work station to the next available position in the queue pattern between his work station and the next work station while simultaneously transferring a workpiece into his work station from the queue pattern preceding his work station.

4 Claims, 2 Drawing Sheets

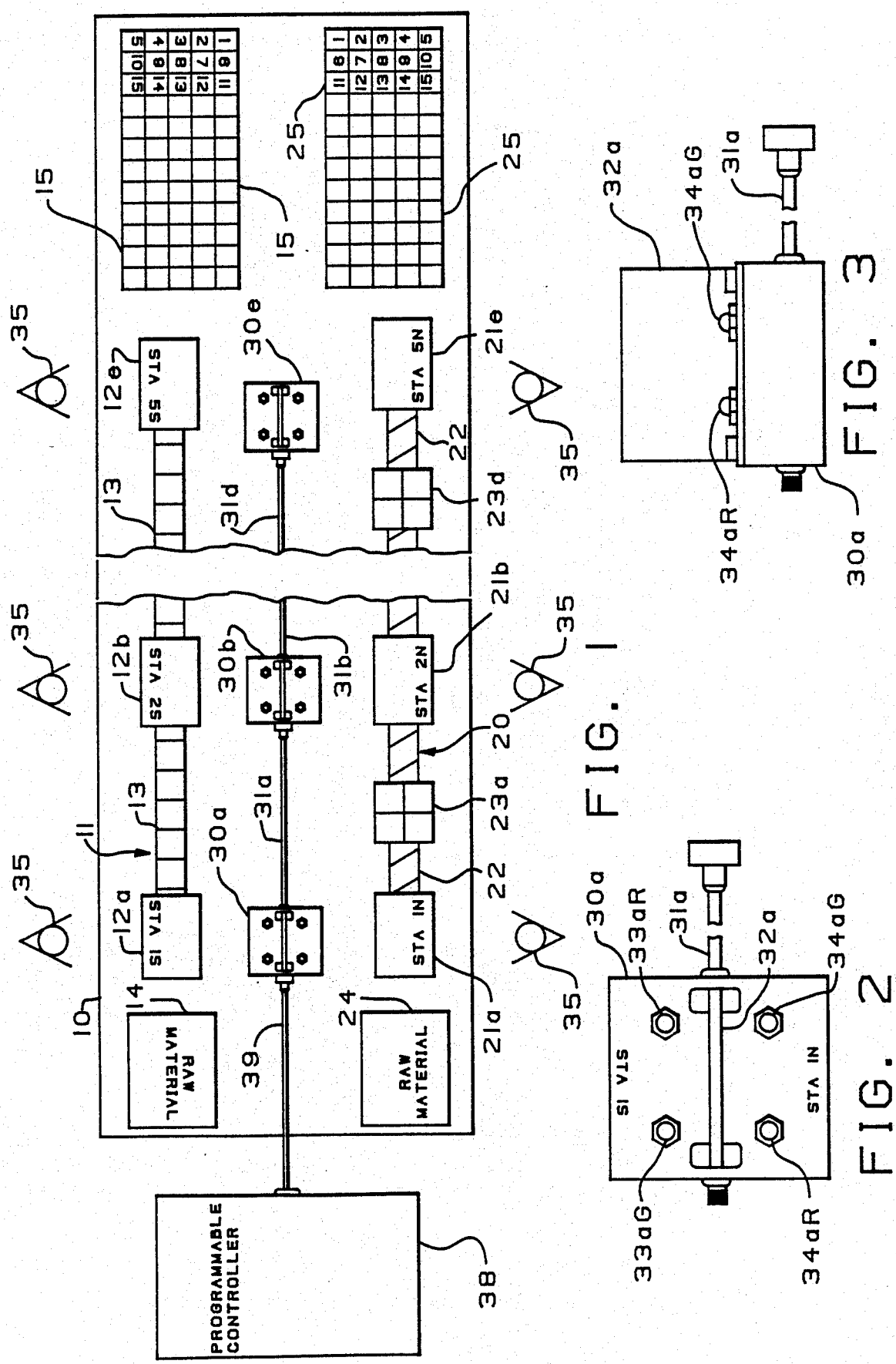

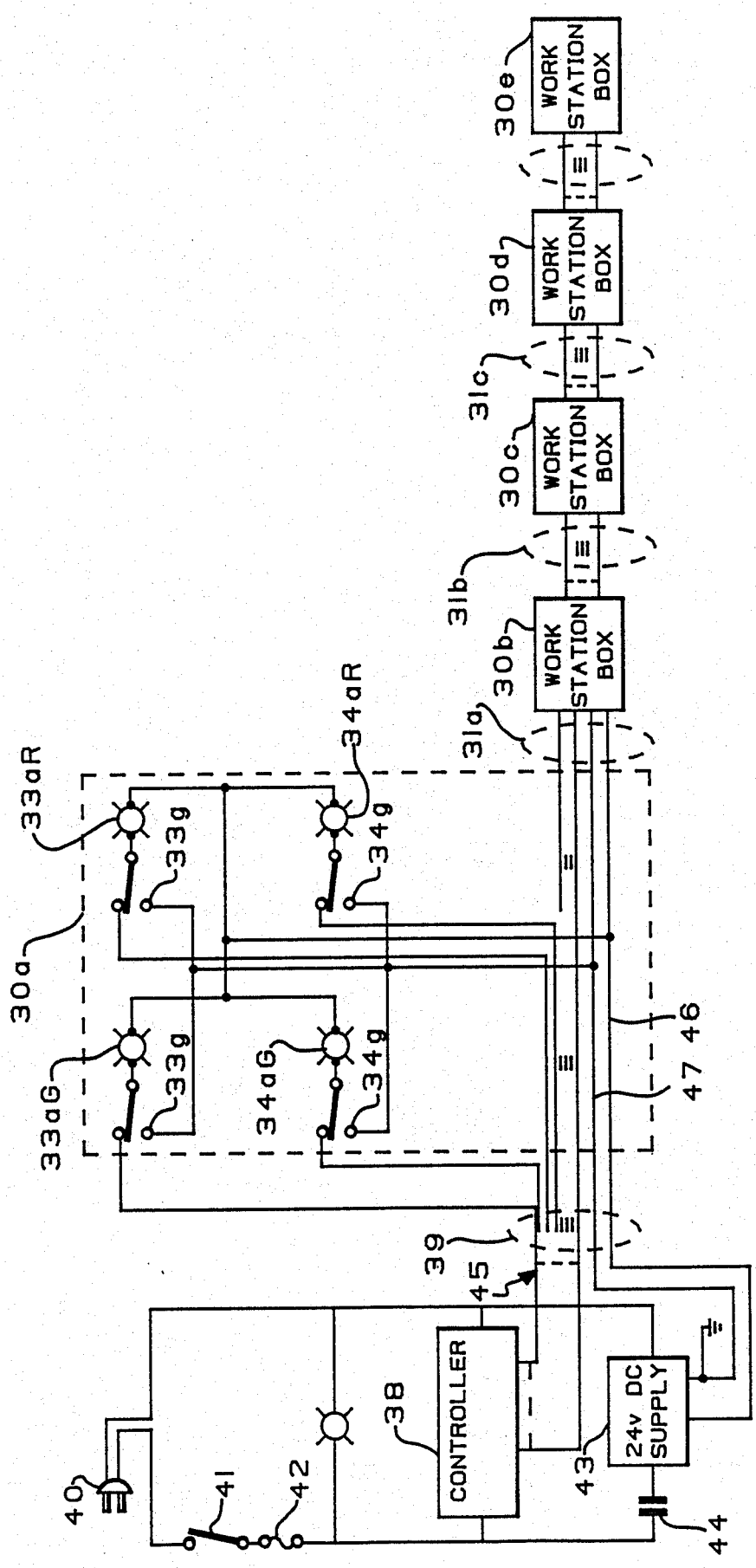

CONVEYOR LINE TRAINING SIMULATOR SYSTEM AND METHOD

BACKGROUND OF THE INVENTION

The present invention relates to a simulator system and method for simulating the performance of synchronous and non-synchronous conveyor lines. More particularly, it relates to a training simulator and method that has as its purpose the graphical illustration of the production efficiencies that can be achieved by use of a non-synchronous conveyor line as compared to use of a synchronous conveyor line.

Synchronous and non-synchronous conveyor lines are well known in the art of manufacturing plant production lines. With a synchronous line, workpieces are conveyed simultaneously and intermittently with all workpieces retaining their relative position in sequence and in relation to the various work stations along the conveyor line. Generally, the allotted time to perform the different work operations at each work station is calculated in advance and the speed of the line is set to accommodate the work station with the longest allotted work time. One difficulty with this is that if any work station has a problem and requires more than the allowed time per station, the work may not be completed or the operator may do a poor quality job in order to complete the operation in time. The remedy is either to allow the operator to stop the line until the problem can be resolved or allow the workpiece to proceed and be shunted aside at some later stage in the line for rework.

A non-synchronous line, on the other hand, is one in which transport pallets carrying the workpieces can be disengaged from the conveyor line by a suitable declutching mechanism operable under control of a work station operator. Alternatively, the pallet can be declutched automatically by feelers that sense a condition requiring the workpiece to come to a stop. This might be, for example, when the travelling workpiece reaches a work station or when it approaches another workpiece ahead of it that has been declutched in a holding or queue position. This allows the conveyor line transfer mechanism to run at a constant speed while at the same time permitting the work station operators to adjust their individual work times to what is needed, within resonable limits, to satisfactorily complete their normal tasks.

While recognized by manufacturing experts as a desirable production line system, it has been found in practice that the advantages of the concept and the manner in which it is to be implemented by operators on an actual line is difficult to convey to people not skilled or expert in production line systems. For example, when first introducing a new non-synchronous conveyor line to production line workers previously trained on a synchronous line, it has been found that despite introductory training meetings at which the non-synchronous conveyor line operation is explained, the production workers, in actual practice, continue to operate in the same mode as they did on a synchronous line. As a consequence, if an operator needed more time to complete his work task, the preceding operator would notice and stop his operation until the first operator cleared his work station. This despite the fact that operator has been instructed to complete his task and move his workpiece into the intermediate holding queue and transfer in a new workpiece even though the first operator might still not be finished with his operation. Surprisingly, it was found that this effect would propagate back up the line with the result that production efficiencies inherent in a non-synchronous line would be diminished or lost. While operators might eventually apply the proper techniques, the learning process tends to be a long one of trial and error, typically involving repeated supervisory instruction. The learning process is hampered by the inability of the operators to fully appreciate how their individual actions of this sort adversely affect the operation of the non-synchronous line. It is desirable that the learning process be shortened so that the advantages of non-synchronous line operation be achieved as quickly as possible with a minimum of training time involved.

Accordingly, it is an object of the present invention to provide a training simulator and method of training that conveys quickly and graphically the operation and advantages of a non-synchronous conveyor line to operators and other involved personnel. It is a further object of the invention to reduce training costs and training time by providing a hands-on visual demonstration of the comparison of synchronous and non-synchronous conveyor line operation. It is a feature of the invention that a series of simulated work stations are provided in a compact layout allowing a number of operators to experience in a short period of time differences between synchronous and non-synchronous line operation and the production efficiencies to be achieved by proper operation of the non-synchronous system. It is a further feature of the invention that the simulated work stations are controlled by a programmable controller to allow for changing operating conditions to demonstrate graphically that benefits are not dependent on any unique set of operating conditions.

BRIEF SUMMARY OF INVENTION

In accordance with the foregoing objects and features of the invention, there is provided a simulator system for training people in the advantages in production efficiency of properly operated non-synchronous conveyor lines over synchronous conveyor lines which comprises, in part, an elongated mat having a diagram thereon illustratively representing parallel conveyor lines, each conveyor line having illustrations of a plurality of operator work stations, each work station from one line being paired with and opposed to a corresponding work station in the other line, one line representing a synchronous line and the other line representing a non-synchronous line, the non-synchronous line having queue patterns illustrated between each work station. The simulator system of the invention further comprises an electrically controlled work station box adapted to be positioned atop the mat between each pair of opposed synchronous and non-synchronous line work stations, each box having a set of "go/no-go" visual indicators representative of the status of work and failure conditions at each of the paired stations. The system further includes controller means coupled to each of the work station boxes to supply control signals to each of the boxes in a random fashion which are representative of station work and failure conditions at each of the paired stations, the work and failure conditions being the same for both sides of each paired station. There is also provided in the system a plurality of workpieces for each conveyor line, the workpieces being representative of products that are sequentially processed on actual conveyor lines. The workpieces of the simulator system are adapted to be moved by trainees stationed at each work station in response to the "go/no-go" indications appearing on the work station box, the workpieces being moved from work station to work station in the case of the synchronous conveyor line, and from queue pattern to work station to queue pattern in the case of the non-synchronous line. With this system, the trainee operators are able to visually appreciate that, after a predetermined time period, more workpieces are processed on the non-synchronous line than on the synchronous line given the same operating conditions on both lines.

The method of the invention comprises the step of laying out an elongated mat diagrammatically illustrating parallel conveyor lines having an equal number of paired, opposed operator work stations in each line, one line representing a synchronous line and the other line representing a non-synchronous line, the non-synchronous line being provided with queue patterns between each work staiton. The method further includes the step of selectively controlling "go/no-go" visual indicator sets, each of which are positioned between a pair of opposed work stations, the indicators being representative of the status of work and failure conditions at paired stations, the indicators being so controlled as to provide indications of work station operating and failure conditions in a random fashion to each of the paired stations with the operating and failure conditions being the same for both sides of each paired station. The method of the invention further comprises the step of having trainees stationed at each of the work stations transfer workpieces along the line in response to the "go/no-go" indications at their respective work stations, a trainee at a synchronous line work station responding to a "go" indication by tranferring his workpiece to the next work station only when the next station is clear and a trainee at a non-synchronous line work station responding to a "go" indication by tranferring his workpiece into the next available space in the queue pattern following his station while simultaneously transferring a workpiece into his work station from the queue pattern preceding his station.

BRIEF DESCRIPTION OF THE DRAWINGS

In the accompanying drawings

FIG. 1 is a top plan view of the simulator system of the invention showing the layout of the mat diagram and the positioning of the work station indicator boxes on the mat;

FIG. 2 is a top plan view of a work station box useful in the invention and showing the visual indicators to be viewed by the trainees;

FIG. 3 is a side elevation view of the work station box of FIG. 2; and

FIG. 4 is a schematic circuit diagram of the controller and the work station boxes useful in the practice of the invention.

DETAILED DESCRIPTION OF THE INVENTION

Referring now to FIG. 1, a preferred embodiment of the training simulator system is shown with a mat 10 on which a diagram has been drawn to illustrate schematically a pair of conveyor lines 11 and 20. The illustration of line 11 represents a synchronous conveyor line having a series of work stations 12a through 12e labeled with the designations "STA 1S" through "STA 5S" and interconnected schematically by a representation of a synchronous transfer mechanism 13. At the front end of line 11 there is an area 14 drawn to represent a source of workpieces with the designation "Raw Material". At the other end of line 11, an area 15 is drawn to provide a place to deposit workpieces after they have transferred through the manufacturing process, as will be described in detail subsequently. Area 15 is preferably drawn with numbered spaces therein to provide a convenient means of showing how many workpieces have been "completed" as the demonstration progresses.

In a similar manner, line 20 is drawn on the mat 10 to represent a non-synchronous conveyor line extending parallel to synchronous line 11. Line 20 has a series of work stations 21a–21e labeled with the designations "STA 1N" through "STA 5N", each of which is paired with and opposed to the correspondingly numbered work station in synchronous line 11. The actual designations used for the work stations in both lines are a matter of choice and, in fact, may be omitted if desired. As with line 11, the work stations in line 20 are interconnected schematically by a conveyor transfer mechanism 22. Unlike line 11, line 20 has a series of holding or queue patterns illustrated between each work station, each queue pattern having a plurality of spaces to receive a workpiece when the workpiece is transferred out of the preceding work station. In the FIG. 1 embodiment, four spaces are shown although the exact number of spaces is not important as long as the number is fairly representative of the typical queue capacity of a non-synchronous line being simulated. A workpiece supply space 24 is drawn at the front end of line 20 and a "completed" workpiece receiving space 25 is drawn at the other end of line 20 in mirror image fashion to spaces 14 and 15 of line 11.

Mat 10 may be a fabric or vinyl type of sheet material on which the diagram is printed or drawn by suitable graphical means and which allows for convenient storage and portability by rolling up or folding. Alternatively, the diagram can be placed on a hard surface such as a table top or on panels that can be hinged or stacked for transportation and storage.

Electrically controlled work station boxes 30a–30e are placed on top of the mat diagram with each box being positioned between a pair of opposed synchronous and non-synchronous work station boxes. The boxes are electrically interconnected by cables 31a–31d. Each box has a set of visual indicators, preferably colored lights, which provide an indication of the status of work and failure conditions at each of the paired work stations. In the system of FIG. 1, each visual indicator set includes a green light 33aG and a red lght 33aR associated with the synchronous work station 12a and, similarly, a green light 34aG and a red light 34aR associated with the non-synchronous work station 21a. An optional opaque barrier 32a may be provided between each pair of indicator lights in the set so as to allow the operator at a work station to concentrate on the lights at his station without being distracted by the lights associated with the opposing work station.

A controller 38, preferably a programmable controller, is coupled to the work station boxes 30a–30e via interconnecting cables 39 and 31a–31e to supply control signals in a random fashion to the work station boxes at each of the paired stations. The control signals illuminate the indicator lights in the boxes in a manner determined by the programmed sequence in controller 38 to provide "go/no-go" indications that are representative of the status of work and failure conditions at each of the stations 12a–12e and 20a–20e and which are used to control the actions of trainee operators 35 stationed the work stations. In an actually constructed embodiment of the invention, the following light definitions have been employed by suitable programming of the controller 38. At each station, a flashing green light indicates that transfer of workpieces is to be initiated. A steady green light indicates work is being performed at the station and no transfer is to occur. A flashing red light indicates that a fault condition exists during which no work can be done at that station. On the synchronous line, a steady red light indicates that a station is down and transfer of workpieces is not possible anywhere on the synchronous line. On the non-synchronous line, a steady red light has the same meaning as a flashing red light. As will be seen, these instructions are designed to conform the actions of the operators to those that would noramlly occur on actual synchronous and non-synchronous conveyor line operations, respectively. Controller 38 is programmed so that the pattern of work/failure indications is the same for each paired set of work stations. This establishes comparable operating conditions on each line and assures that the results achieved by the end of the demonstration are not biased as a result of more favorable operating conditions on the non-synchronous line.

Referring to FIG. 4, a suitable control arrangement for the simulator system is shown in which controller 38 is powered from a 120 volt electrcal supply source 40 through on/off switch 41 and fuse 42. A 24 volt d.c. supply 43 for the indicator lights of work station control boxes 30a–30e is activated from controller 38 by means of a normally open relay 44. The control signals from controller 38 are provided to the individual indicator lights by means of a plurality of separate connecting wires, in this case twenty such wires shown generally as lines 45, in interconnecting cable 39 and cables 31a–31d.

Since all of the work station boxes are of identical design, only box 30a is shown in detail. A 24 volt operating voltage on line 46 is applied in common to each of the indicator lights 33aG, 33aR, 34aG and 34aR, while ground is applied to switch terminals 33g and 34g. The controller 38 is suitably programmed to cause output signals to actuate the work station box switches at predetermined times to apply ground from terminals 33g and 34g to the indicator lights in the desired sequence to represent "go/no-go" conditions at each respective simulated work station. Controller 38 may be any conventional sequencing controller programmable to provide output control signals sequenced in any desired random manner that would represent the desired pattern of work failure conditions at each of the simulated work stations.

In operation, individuals 35 (FIG. 1), who may be operator trainees or other personnel being exposed to the benefits of non-synchronous conveyor line technology, are positioned at the various work stations and provided with operating instructions as follows:

SYNCHRONOUS LINE

WHEN GREEN LIGHT FLASHES

Station 12a (STA 1S)—Simultaneously pick up the workpiece in work station and a workpiece from supply space 14 and transfer them to the next available positions, i.e. transfer the work station 12a workpiece to work station 12b and the workpiece from supply space 14 into work station 12a.

Stations 12b–12d (STA 2S–STA 4S)—Pick up workpiece in the work station and transfer it to the next work station.

Station 12e (STA 5S)—Pick up workpiece in work station and transfer it to the next higher numbered space in the "completed product" grid 15.

STEADY GREEN LIGHT

All Stations—No transfer. This indication represents time that an operator would actually be doing work on the product in his work station. Only one workpiece can be in a work station at a time. A workpiece must be in a work station for one steady green light period before transfer out can take place.

FLASHING OR STEADY RED LGHT

All Stations—No transfer of workpieces is allowed.

NON-SYNCHRONOUS LINE

FLASHING GREEN LIGHT

Station 21a (STA 1N)—Pick up workpieces from work station and supply space 24 and transfer to next available positions, i.e. transfer workpiece from work station to open space in queue grid 23a and transfer workpiece from supply space 24 into the work station. If there is no available space in queue grid 23a, no transfer can take place.

Station 21b–21d (STA 2N–4N)—Simultaneously transfer workpiece from work station into open space in following queue grid and transfer workpiece from preceding queue grid into work station. Only one workpiece in a work station at a time. If no available space in following queue grid, no tranfer can take place.

STEADY GREEN LIGHT

All Stations—No transfer, same as synchronous line. A workpiece must remain in work station for one steady green light period before being transferred out.

FLASHING OR STEADY RED LIGHT

All Stations—No transfer of workpieces is allowed.

Having provided the trainee operators 35 with the above instructions, the controller 38 is turned on to begin the supply of control signals to work station boxes 30a 30e. At the end of a predetermined time period, typically five minutes is sufficient, the controller 38 is turned off and the demonstration is ended. At this point it is immediately apparent to the trainees 35 from a visual inspection of "completed product" grids 15 and 25 that the non-synchronous conveyor line has produced more completed products than the synchronous line. Because the demonstration is of such short duration and so compactly presented, it can be repeated, preferably with a change in the programming of the control signals from programmable controller 38, in order to convince anyone with any doubts as the accuracy or repeatability of the results of the first demonstration.

In the simulator system described, five sets of paired work stations are employed. It will be appreciated that any number of work station pairs may be employed although the use of five is sufficient to illustrate the advantage of non-synchronous line operation without unduly extending the size of the system.

Many changes and modifications in the above described embodiment of the invention can of course be carried out without departing from the spirit and scope thereof. Accordingly it is intended by the appended claims to cover all such modifications and changes.

What is claimed is:

1. A method of demonstrating the advantage in production efficiency of non-synchronous conveyor lines over synchronous conveyor lines, comprising:

providing an elongated diagram illustrating parallel conveyor lines with an equal number of paired, opposed operator work stations in each line, one line representing a synchronous line and the other line representing a non-synchronous line, the non-synchronous line being provided with queue patterns between each work station;

providing an electrically controlled work station box between each pair of opposed synchronous and non-synchronous work stations on the mat, each box having a set of "go/no-go" visual indicators, the indicators being representative of the status of work and failure conditions at paired stations;

coupling a signal controller to each of the operating station boxes, the controller being programmed to provide control signals in a random fashion to each of the paired work stations, the control signals being representative of work station operating and failure conditions at each of the paired stations, the operating and failure conditions being the same for both sides of each paired station;

providing a plurality of workpieces for each conveyor line which are representative of products being sequentially processed on actual conveyor lines;

and positioning operators at each of the synchronous and non-synchronous work stations with instructions for each synchronous station to respond to a "go" indication at his work station to transfer the workpiece from that work station to the next work station and for the non-synchronous operator to respond to a "go" indication at his work station to transfer the workpiece from that work station to the next available position in the queue pattern between his work station and the next work station while simultaneously transferring a workpiece into his work station from the queue pattern preceding his work station.

2. A method of training people in the advantage in production efficiency of non-synchronous conveyor lines over synchronous conveyor lines, comprising:

laying out an elongated diagram illustrating parallel conveyor lines having an equal number of paired, opposed operator work stations in each line, one line representing a synchronous line and the other line representing a non-synchronous line, the non-synchronous line being provided with queue patterns between each work station;

selectively controlling a plurality of visual indicator sets to provide a predetermined series of "go/no-go" visual indications, each indicator set being positioned between a pair of opposed work stations, the "go/no-go" indications being representative of the status of work and failure conditions at paired stations, the indicator sets being so controlled as to provide indications of work station operating and failure conditions in a random fashion to each of the paired stations with the operating and failure conditions being the same for both sides of each paired station;

stationing trainees at each of the work stations;

providing each simulated conveyor line with a plurality of workpieces;

and instructing said trainees to tranfer said workpieces along their respective conveyor lines in response to the "go/no-go" indications at their respective work staitons, a trainee at a synchronous line work station responding to a "go" indication by transferring his workpiece to the next work station only when the next station is clear and a trainee at a non-synchronous line work station responding to a "go" indication by transferring his workpiece into the next available space in the queue pattern following his station while simultaneously transferring a workpiece into his work station from the queue pattern preceding his station.

3. A conveyor line simulator system for demonstrating the advantage in production efficiency of non-synchronous conveyor lines over synchronous conveyor lines, comprising:

an elongated diagram illustratively representing parallel conveyor lines, each conveyor line having illustrations of a plurality of operator work stations, each work station from one line being paired with and opposed to a corresponding work station in the other line, one line representing a synchronous line and the other line representing a non-synchronous line, the non-synchronous line having queue patterns illustrated between each work station;

a plurality of electrically controlled work station boxes, each adapted to be positioned atop the diagram between each pair of opposed synchronous and non-synchronous work stations, each box having a set of "go/no-go" visual indicators representative of the status of work and failure conditions at each of the paired stations;

controller means coupled to each of the work station boxes for supplying control signals representative of station work and failure conditions to each of the paired stations in a random fashion, the work and failure conditions being the same for both sides of each paired station;

a plurality of workpieces for each conveyor line representative of products sequentially processed on actual conveyor lines and adapted to be moved by operators stationed at each work station in response to said "go/no-go" indications, from work station to work station in the case of the synchronous conveyor line, and from queue pattern to work station to queue pattern in the case of the non-synchronous line;

whereby, after a predetermined time period, the greater number of workpieces accumulated at the output of the non-synchronous line as compared to the output of the synchronous line visually demonstrates the advantage of the non-synchronous line operation given the same operating conditions on both lines.

4. The simulator system of claim 3 in which each of said visual indicator sets includes a separate pair of indicator lights, each pair of lights being adjacent to its associated work station when the work station box is in position; and further including a visual barrier panel placed between opposing pairs of indicator lights to prevent an operator from being distracted by the indicator lights of the opposing work station.

* * * * *